W. W. QUINN.
LAUNDRY CONVEYER DROP.
APPLICATION FILED JAN. 12, 1911.
1,041,870.
Patented Oct. 22, 1912.
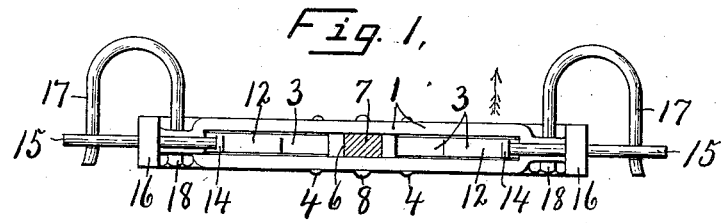
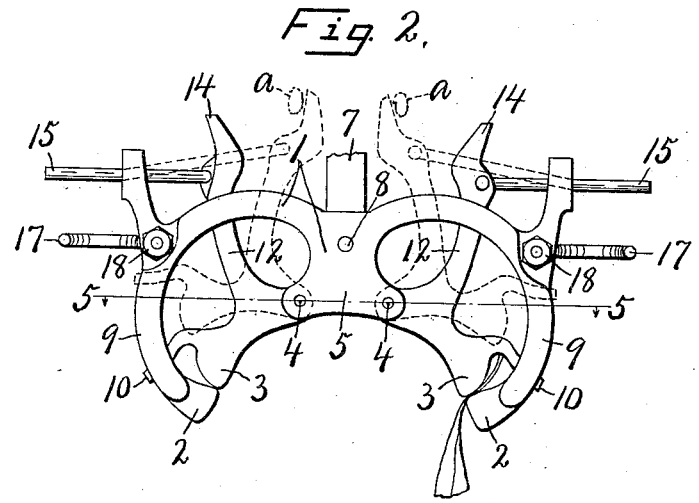
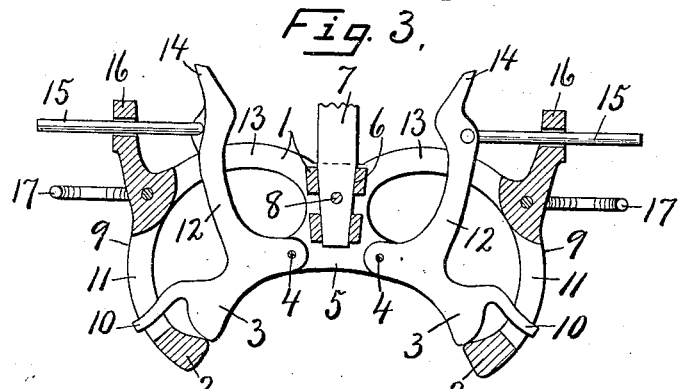
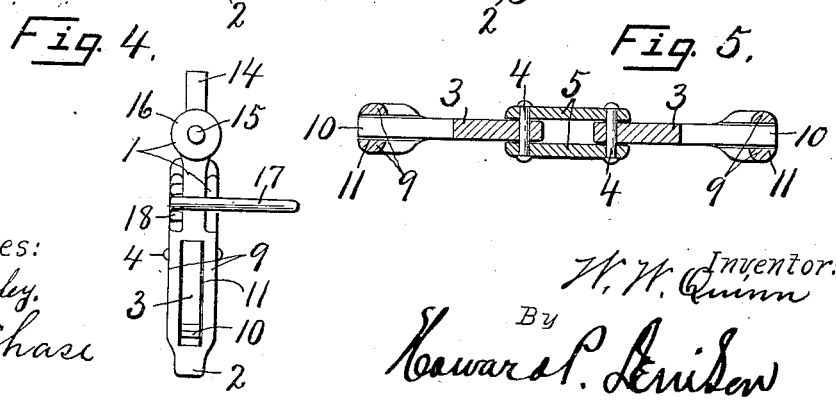
Witnesses:
R. W. Bailey.
H. E. Chase.
Inventor:
W. W. Quinn
By Howard P. Denison
Attorney.
COLUMBIA PLANOGRAPH CO., WASHINGTON, D. C.

UNITED STATES PATENT OFFICE.

WILBUR W. QUINN, OF GOSHEN, INDIANA, ASSIGNOR OF ONE-HALF TO NATIONAL CHEMICAL COMPANY, OF SYRACUSE, NEW YORK, A CORPORATION OF NEW YORK.

LAUNDRY CONVEYER-DROP.

1,041,870.  Specification of Letters Patent.  Patented Oct. 22, 1912.

Application filed January 12, 1911. Serial No. 602,311.

*To all whom it may concern:*

Be it known that I, WILBUR W. QUINN, of Goshen, in the county of Elkhart, in the State of Indiana, have invented new and useful Improvements in Laundry Conveyer-Drops, of which the following, taken in connection with the accompanying drawings, is a full, clear and exact description.

This invention relates to certain improvements in laundry conveyer drops of the class set forth in my pending application No. 593,091 filed November 18, 1910, in which a comparatively light skeleton frame or head is suspended from a conveyer chain and provided with fixed jaws and gravity operated movable jaws coacting therewith to grip and hold the laundried articles in transit through a suitable drying room.

As explained in my previous application referred to, it is desirable to provide suitable means for preventing the laundried articles from catching upon or adhering to the movable jaws when said jaws are released from their gripping position upon their exit from the drying room, the object being to more positively assure the dropping of the articles by their own gravity when the jaws are thus released. I have discovered, however, that the means provided in my former application for preventing the laundried articles from being caught upon the gripping ends of the jaws is not so effective as I anticipated.

One of the objects, therefore, of my present invention is to provide the gripping ends of the jaws with suitable shoulders or arms projecting therefrom beyond the adjacent portions of the frame so as to limit the upward movement of the garment in inserting it between the jaws and thereby more effectively prevent such garment from catching upon the upper portions of the gripping ends of the jaws, for it is well known that as these laundried articles dry, their edges curl over more or less and are therefore liable to become caught upon projecting portions of the jaws unless some provision is made to guard against it.

Another object is to locate the tripping arms of the movable jaws some distance to the outside of their pivots so as to add additional weight to the closing of the jaws and thereby increase their gripping ability when in a closed position.

Other objects and uses will be brought out in the following description.

In the drawings—Figures 1 and 2 are respectively a top plan and face view of one of my improved conveyer drops showing a portion of the supporting stem. Fig. 3 is a central longitudinal sectional view of the same drop. Fig. 4 is an edge view of the same device. Fig. 5 is a horizontal sectional view taken on line 5—5, Fig. 2.

This device is adapted to be attached to and suspended from a suitable conveyer chain not shown but which is arranged to travel through a drying room at a slow rate of speed to dry the laundried articles while held in the grip of the drop and adapted to be released upon emerging from the drying room by contact of portions of the movable jaws with a suitable cam track or tripping mechanism not necessary to herein illustrate or describe as the operation of the conveyer chain and tripping device is well known.

This particular drop comprises a light skeleton frame —1— of cast metal or equivalent material having a pair of fixed gripping jaws —2— and movable jaws —3— which are also made of metal in the form of bell crank levers and are pivoted at —4— to a central pendant head —5— of the main supporting frame —1—.

The head —5— is provided with a central tapering socket —6— opening from the top for receiving a corresponding tapering end of a supporting rod —7— which is adapted to be attached to one of the links of a conveyer chain not shown, the head —1— or frame —5— being firmly locked to the supporting bar —7— by means of a key —8—. This head —5— is also provided with oppositely curved arms —9— extending outwardly and downwardly from the upper portion of the head above the pivots —4— and terminate in the fixed jaws —2— in a plane some distance below said pivots, leaving considerable intervening space between the fixed jaws and also between said jaws and the head —5— for the free play of the movable jaws —3— and also for the reception of the laundried articles to be dried between said jaws, the gripping points of the fixed jaws —2— being located in the arc of movement of the gripping points of the movable jaws —3— although the inner faces of the arms —9— above the fixed jaws —2— are arched outwardly beyond the arc of movement of the gripping faces of the movable jaws so as to leave ample clearance for the reception of the articles to be dried between the coacting sets of jaws. These movable jaws —3— are provided with laterally extending arms or stop shoulders —10— which project some distance beyond the inner faces of the arms —9— and preferably through elongated slots —11— in which they are adapted to play as the movable jaws are opened and closed. These arms or extensions —10— are located some distance above the gripping points of the jaws —2— and —3— to allow limited portions of the articles to be dried to be inserted between said jaws but at the same time limiting the upward movement of such articles, thereby preventing them from curling over or becoming caught upon the upper edges of the movable jaws and permitting such articles to readily gravitate from between the coacting sets of jaws when the movable jaws are tripped or moved from the gripping position.

In addition to the function of the extensions —10— in preventing the laundried articles from becoming caught upon the movable jaws, they also serve to guide said jaws in their vertical movement and thereby maintain a more perfect registration between the gripping points of the jaws. These movable jaws are also provided with integral upwardly projecting arms —12— located substantially midway between the pivots —4— and gripping points so as to produce additional weight outside of the pivots tending to close the movable jaws upon the articles more positively and effectively than would be possible if the arms —12— were located directly over the pivots. These arms —12— extend upwardly through horizontally elongated slots —13— in the arms —9— and some distance above said arms and terminate in outwardly deflected extensions —14— forming finger pieces by which the jaws may be opened by hand and also serving as contact pieces for engagement with suitable cams or rails —a— indicated by dotted lines in Fig. 2 for opening the jaws and releasing the articles as the drops emerge successively from the drying room.

Pivotally secured to and movable with the upper ends of the arms —12— of the jaws —3— are horizontally disposed pins —15— of wire or other suitable material which are guided in apertured lugs or ears —16— rising from the central portions of the arms —9— between the slots —13—. When the movable jaws are in their closed position these arms —15— project outwardly a sufficient distance beyond the outer faces of the arms —16— to receive and support collars, cuffs and similar apertured articles which are held on said pins or arms against accidental displacement by underlying loop-shaped guards —17—.

The amount of projection of the pins or arms —15— beyond the outer face of the ears or lugs —16— when the jaws are closed is substantially equal to or slightly less than the length of the arc of movement of the portions of the jaws to which they are attached as operated by the cam rails —a— in opening the jaws so that when the pins are withdrawn inwardly, the articles which may be supported thereby will be drawn against the outer faces of the ears or lugs —16— and will thereby be forced off from the outer ends of the pins and allow such articles to drop by gravity when the jaws are opened by the cam rails —a—.

The guards —17— consist of open sided loops projecting laterally and horizontally from the main supporting frame to which they are secured by suitable fastening means as nuts —18—, the open sides of the loops facing in a direction opposite to the direction of movement of the conveyer chain so as to prevent any possibility of the released articles being caught upon the loops.

In operation portions of the more or less damp articles to be dried are inserted by hand between the coacting sets of jaws —2— and —3—, the movable jaws being opened by mere pressure of the articles against their gripping faces or against the limiting stops —10— which limit the upward movement of the articles relatively to the gripping faces of the jaws, said jaws instantly closing by their own gravity to grip the articles when the latter are released while the weight of the articles or any downward pull upon them serves to grip the jaws more tightly upon them, thereby preventing any possibility of the articles becoming disengaged from the jaws while passing through the drier. Other articles such as collars, cuffs may be placed upon the outer ends of the pins —15— within the loops —17— as the drops with the dried articles thereon emerge from the drier. The extensions —14— of the arms —12— are engaged by the cam rails —a— for opening the jaws and withdrawing the pins —15—, thereby releasing the articles from between the jaws and also from the pins simultaneously and allowing them to drop into a suitable receptacle not shown.

What I claim is:

1. A drop-carrier for conveyer chains comprising a frame having a central head and fixed jaws spaced some distance apart from the head, movable jaws pivoted to the head and extending across such space and coacting with the fixed jaws to grip articles between them, said jaws having upwardly extending arms located between their pivots and gripping points and extending some distance above the arms of the frame, horizontally disposed pins secured to and projecting outwardly from the upper ends of said arms, and apertured guides on the frame for receiving and guiding the outer ends of the pins.

2. A drop carrier for endless conveyers comprising a head having oppositely projecting slotted arms terminating in jaws, and opposite movable jaws pivoted to the head to coact with the first named jaws and provided with stop shoulders guided in the slots in the arms.

3. A drop carrier for endless conveyers comprising a head having oppositely projecting slotted arms extending downwardly some distance below the head and terminating in relatively fixed jaws, and movable jaws pivoted to the head to coact with the relatively fixed jaws and provided with laterally projecting stops guided in the slots in the arms.

4. A drop carrier for endless conveyers comprising a head having oppositely projecting arms extending downwardly some distance below the head and terminating at their lower ends in relatively fixed jaws, and movable jaws coacting with the relatively fixed jaws and pivoted to the head at points some distance above the points of contact between the jaws.

In witness whereof I have hereunto set my hand on this 4th day of January 1910.

WILBUR W. QUINN.

Witnesses:
H. E. CHASE,
E. F. SPEARING.

---

Copies of this patent may be obtained for five cents each, by addressing the "Commissioner of Patents, Washington, D. C."